March 19, 1940.  E. F. W. ALEXANDERSON  2,193,914
ELECTRIC VALVE FREQUENCY CONVERTING SYSTEM
Original Filed Feb. 17, 1938  4 Sheets-Sheet 1
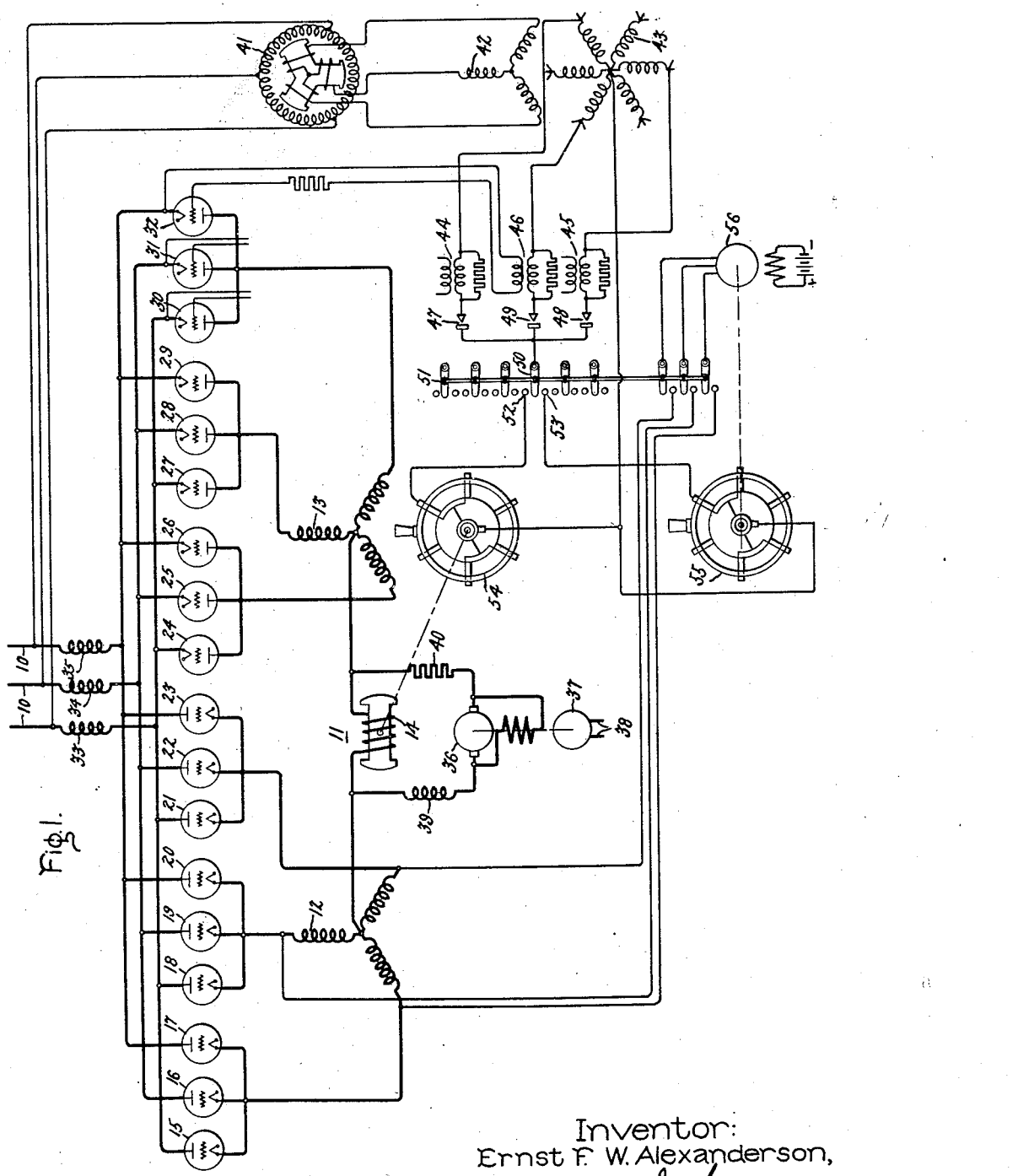
Inventor:
Ernst F. W. Alexanderson,
by Harry E. Dunham
His Attorney.

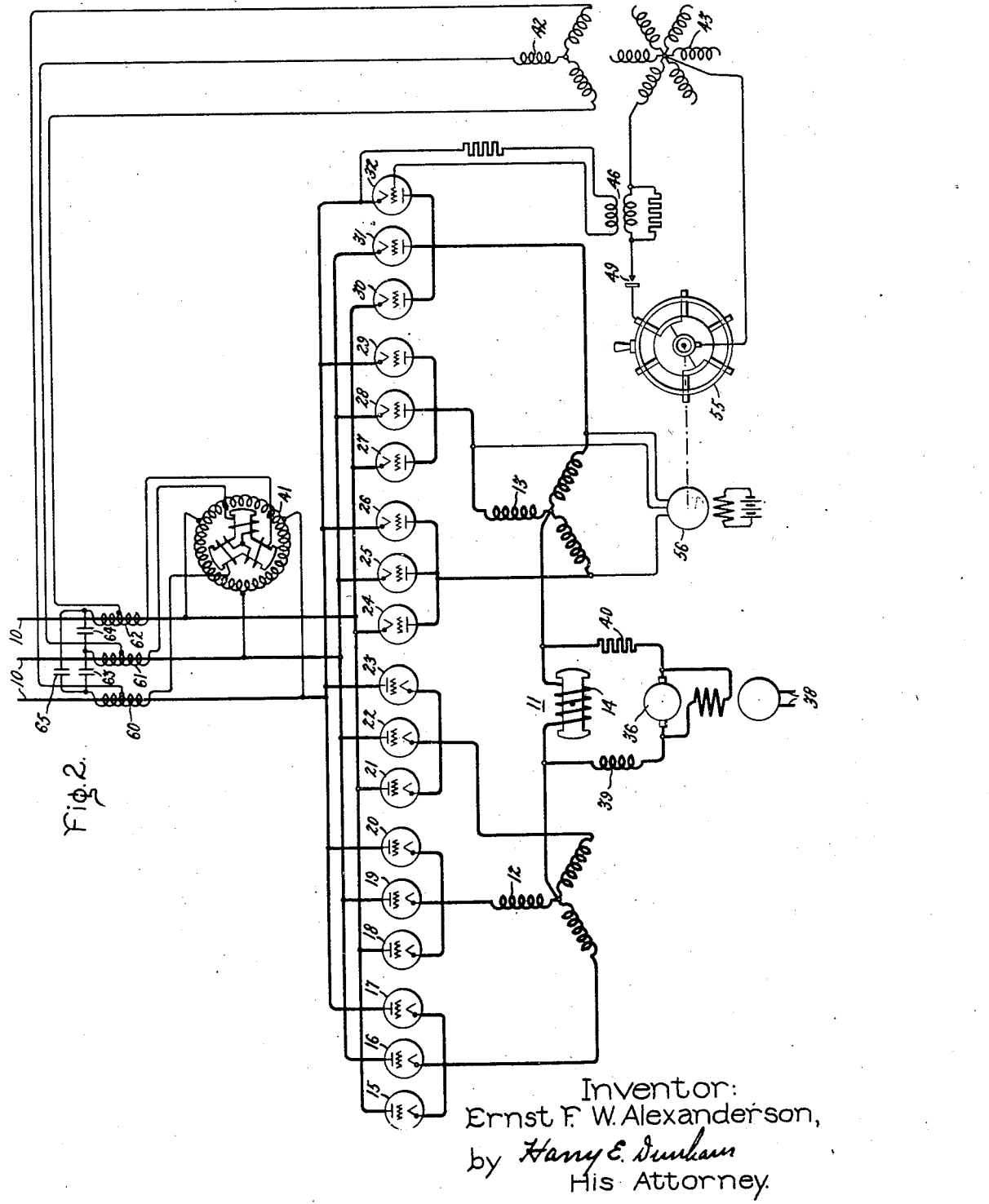

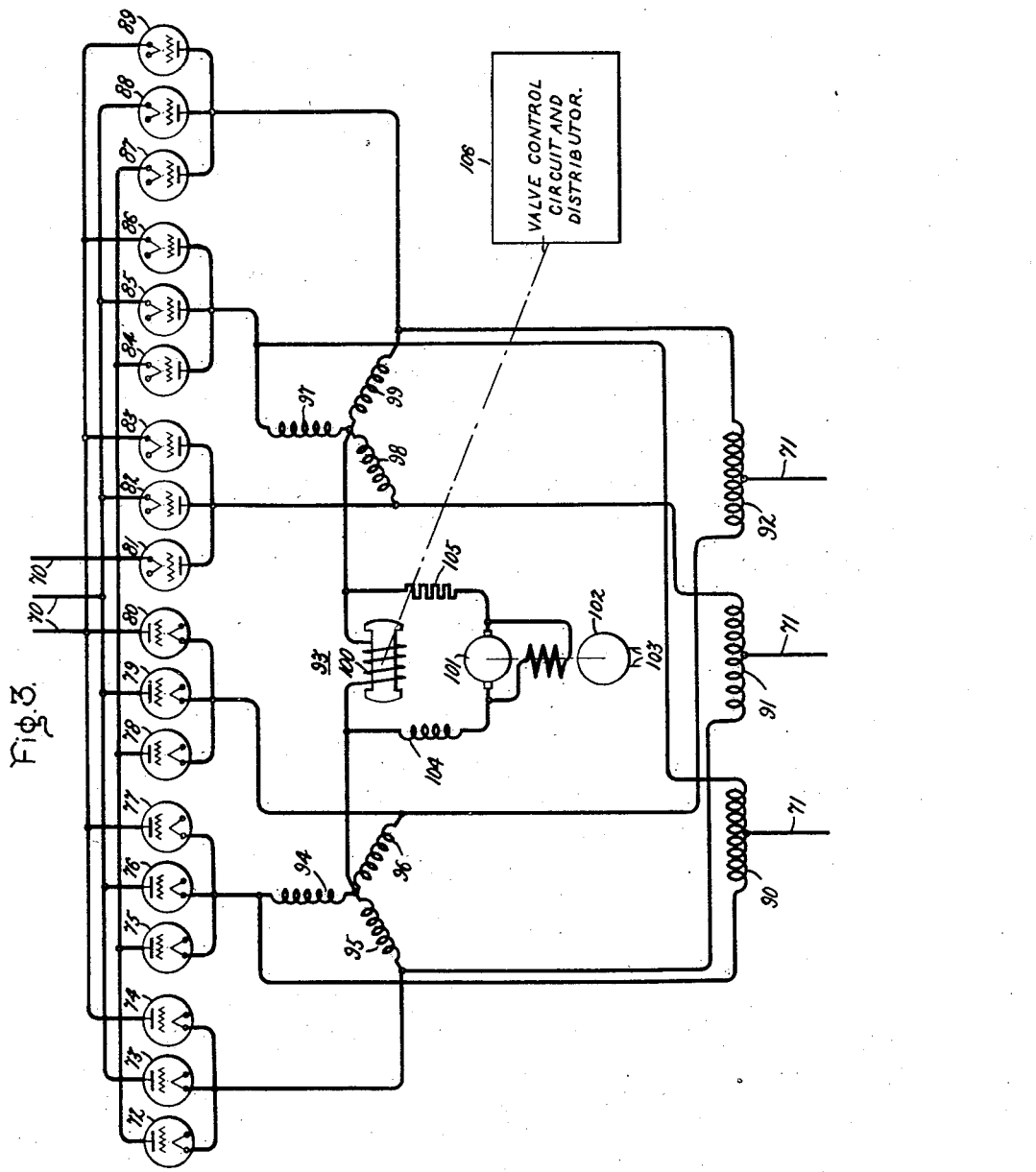

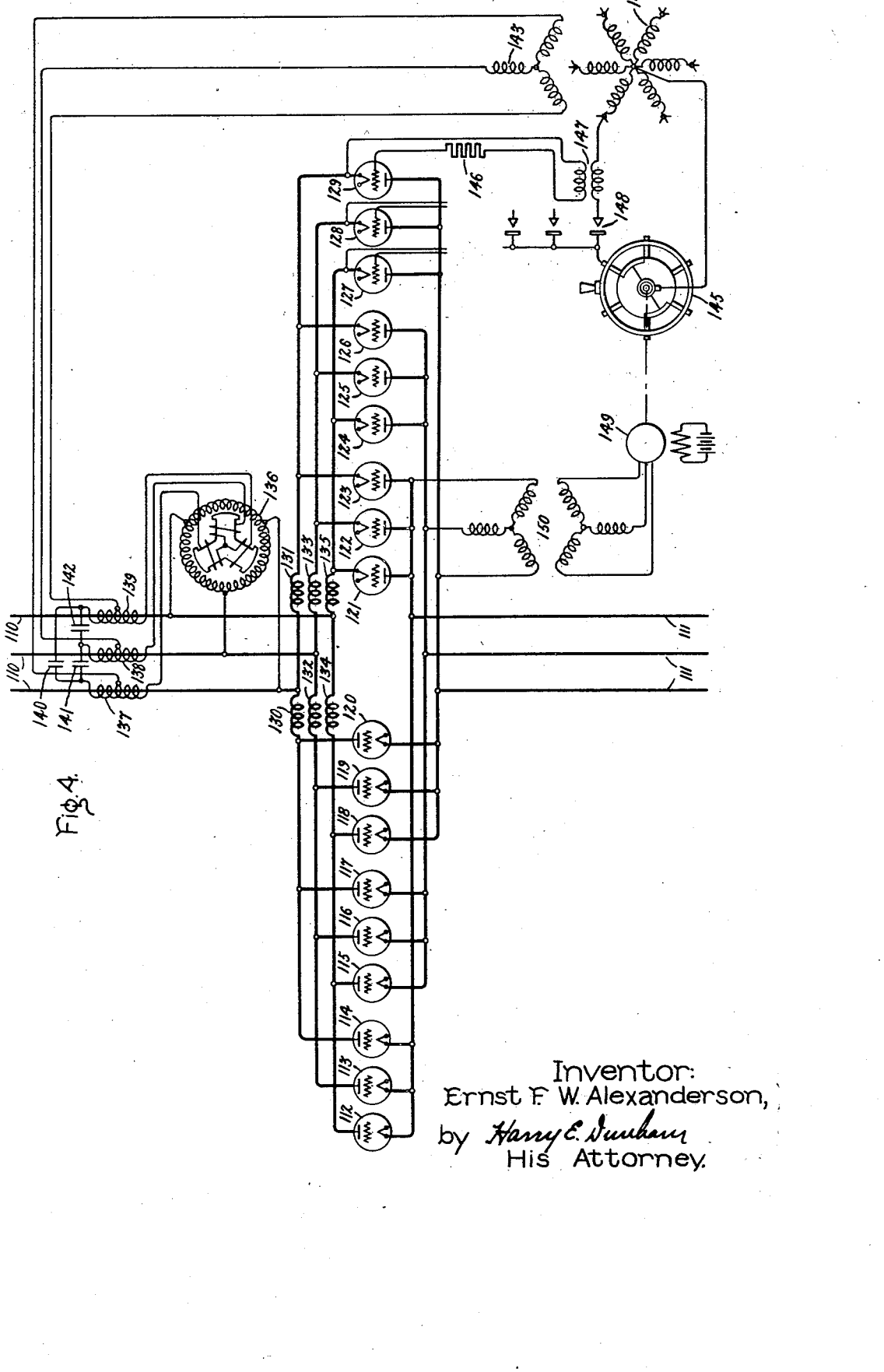

Patented Mar. 19, 1940

2,193,914

UNITED STATES PATENT OFFICE

2,193,914

ELECTRIC VALVE FREQUENCY CONVERTING SYSTEM

Ernst F. W. Alexanderson, Schenectady, N. Y., assignor to General Electric Company, a corporation of New York Original application February 17, 1938, Serial No. 191,053. Divided and this application November 30, 1938, Serial No. 243,191

11 Claims. (Cl. 172—274)

My invention relates to electric valve frequency converting systems, and more particularly to such systems adapted to transmit energy from an alternating current supply circuit to a variable frequency alternating current load circuit or device, such for example, as an inductive load or motor.

This application is a division of my copending application, Serial No. 191,053, filed February 17, 1938, entitled Electric valve frequency converting system, and assigned to the assignee of the present application.

Heretofore, electric valve frequency converting systems have been utilized to supply energy to an alternating current motor of the synchronous type and the speed of the motor was controlled by varying the frequency of the output current of the electric valve system. For certain applications of such an arrangement it would be desirable if the motor had a limited speed at no load and a relatively constant speed between no load and full load values. In accordance with my invention this may be accomplished by controlling the ignition of the valves of the system in accordance with an electrical condition of the motor. By also controlling the ignition of the valves of the electric valve converting system in accordance with the input current to the system a still more desirable speed characteristic of the motor may be obtained.

In the instance of electric valve frequency converting systems supplying a load device other than a motor it has also been found that under certain conditions of the output circuit the system is not as stable in operation as may be desired. The output current of the electric valve frequency converting apparatus has a power factor which tends to lower the voltage and reduce the counter-electromotive force thereby causing instability of the electric valve system. In accordance with my invention this tendency toward instability may be corrected by supplying an auxiliary capacitor or condenser which absorbs the demagnetizing component of the output current. Another method of counteracting this instability is to control the ignition of the valves of the apparatus in accordance with the electrical conditions of both the input and output circuits of the system.

It is therefore an object of my invention to provide an improved electric valve frequency converting system for transmitting energy between two alternating current circuits which will overcome certain limitations of the arrangements of the prior art, and which will be efficient and reliable in operation.

It is a further object of my invention to provide an electric valve frequency converting system for operating a variable speed motor having compound field excitation.

Still another object of my invention is to provide an electric valve converting system supplying energy to a compound excited motor in which the valves of the system are controlled in accordance with an electrical condition of the motor.

It is a still further object of my invention to provide an electric valve operated compound excited motor wherein the valves are controlled in accordance with an electrical condition of the motor and in accordance with the amount of energy flowing in the input circuit to the valve apparatus.

A still further object of my invention is to provide an improved variable frequency electric valve converting system having improved power factor and stable operating characteristics.

Still another object of my invention is to provide a variable frequency electric valve converting system in which the valves of the system are controlled in accordance with an electrical condition of the output circuit and in accordance with an electrical condition of the input circuit.

The novel features which I believe to be characteristic of my invention are set forth with particularity in the appended claims. My invention itself, however, both as to its organization and method of operation, together with further objects and advantages thereof, will be better understood by reference to the following description taken in connection with the accompanying drawings in which Fig. 1 shows an electric valve frequency converting system arranged to control the operation of a synchronous type alternating current motor having a compound field excitation; Fig. 2 discloses an electric valve frequency converting system for controlling an alternating current motor having a compound field excitation and in which the valves of the system are controlled in accordance with electrical conditions of the input and output circuits of the valve system; Fig. 3 shows an improved arrangement for an electric valve frequency converting system in which a condenser absorbs the demagnetizing component of the output current; and Fig. 4 discloses an improved electric valve frequency converter in which the valves of the frequency converter are controlled in accordance with the electrical conditions of the input and output circuits.

Referring more particularly to Fig. 1 of the drawings, there is illustrated an arrangement embodying my invention for transferring energy between a polyphase alternating current circuit 10 and an alternating current motor 11 which is provided with two groups of phase windings 12 and 13 and a field winding 14 connected in series between said phase windings. One group of valves 15, 16 and 17 connects one terminal of one of the phase windings 12 to each of the three conductors of the alternating current supply circuit 10. Similarly, each group of three valves 18, 19, 20; 21, 22, 23; 24, 25, 26; 27, 28, 29; 30, 31, 32, each connect a different one of the phase windings of the phase winding groups 12 and 13 to a polyphase alternating current supply circuit 10. While for the purpose of simplicity each of the electric valves 15 to 32, inclusive, has been disclosed as being provided with an anode, a cathode, a control grid and containing an ionizable medium, it is to be understood that any of the several types of electric valves well known in the art may be utilized which have an anode, a cathode and a control electrode or starting ignitor contained in an ionizable medium. To prevent undesirable interaction between the alternating current supply circuit 10 and the valve apparatus inductors 33, 34 and 35 are connected between the supply circuit and the valves of the frequency converter. A direct current generator 36 driven by a suitable motor 37 energized from a source of current 38 is connected in parallel through an inductor 39 and a resistor 40 with the field winding 14 of the alternating current motor 11. The inductor 39 operates to make the circuit more responsive to transients and to retain the smoothing effect of the field winding of the motor. Resistor 40 is selected to have a value which permits the proper amount of current flowing between the neutral points of the phase winding groups 12 and 13 to pass through the field winding 14. This current is just sufficient to counter-balance the demagnetizing effect of the armature reaction of the motor 11.

The control circuits for the valves of the converting system are energized by alternating current obtained from the supply circuit 10 thrugh a phase shifting device 41 which is connected to a transformer having primary windings 42 and secondary windings 43. Three of the windings of the secondary windings 43 are each connected to a different primary winding of the control transformers 44, 45 and 46, respectively. The secondary windings of the transformers 44, 45 and 46, respectively, control the ignition of the group of valves 30, 31 and 32, respectively. The other terminals of the primary windings of the transformers 44, 45 and 46 are connected respectively through unilaterally conductive devices 47, 48 and 49 to a switch arm 50 of the switch 51. The switch arm 50 is adapted to contact either of two contacts 52 and 53, one of which is connected to a brush of the distributor 54 and the other of which is connected to a brush of the distributor 55. The distributor 54 is mounted on the shaft of a rotatable field winding 14 of the motor 11, whereas the distributor 55 is mounted on the shaft of a synchronous motor 56 which is adapted to be energized by means of the switch 51 from one of the phase windings 12 or 13 of the motor 11. The distributor 54 serves as a control distributor during the starting operation whereas the distributor 55 serves as a control distributor during the running operation after the motor has reached a predetermined speed. Actuation of the switch 51 to the upper and lower positions respectively selects the commutators 54 and 55 and when in the lower position also connects the synchronous motor 56 to be energized from one of the phase windings of the motor 11.

The general principles of operation of the above described arrangement for transmitting energy from the alternating current circuit 10 to the motor 11 will be well understood by those skilled in the art, and will be found in detail in U. S. Letters Patent, Reissue No. 20,364 granted May 18, 1937, upon an application of E. F. W. Alexanderson and in U. S. Letters Patent No. 1,971,833 granted August 28, 1934, upon an application of E. L. Phillipi and which are both assigned to the same assignee as the present application. The Reissue Patent No. 20,364 discloses and broadly claims the above described power circuit as well as the feature of selectively energizing the grids of the several electric valves from a source of alternating potential through a distributor. Patent No. 1,971,833 discloses and broadly claims the use of unilaterally conductive devices in conjunction with a distributor for obtaining a simplified control of the moments of ignition of the valves by means of a distributor.

In operation the distributors 54 and 55 determine the length of time of the unidirectional current impulses flowing through each of the phase windings of the groups of windings 12 and 13 and it will be apparent that as the motor increases in speed these unidirectional current periods are shorter. Thus the valves 15 to 32 are rendered conductive in proper sequence so as to sequentially energize the various windings of the phase winding groups 12 and 13 thereby causing the rotatable field winding 14 to shift in position. During the starting operation the distributor 54 therefore controls the conductivity of the various electric valves in accordance with the position of the rotatable field 14. In the arrangement shown where the field winding 14 is provided with an auxiliary source of excitation the displacement of the field with reference to the poles of the motor does not remain constant and there is a shifting of the electromotive force of the phase windings with reference to the pole structure. If the brushes of the distributor 54 were adjusted for one particular load it would not be correct for other loads. The shifting of the field structure with respect to the terminal voltage of the phase windings as the load varies shifts the distributor 54 with respect to the voltage of the phase windings with the result that the valves of the converting system are not rendered conductive at the same point in the terminal voltage wave of the phase windings as the load varies when the distributor 54 is in control. Thus the distributor 55 is switched into operation and this distributor will always remain in proper phase relation with respect to the terminal voltage of the alternating current motor 11 due to the fact that the synchronous motor 56 maintains the proper phase relation. Thus there is a correction of the tendency of excessive speed at light load and also a correction of the danger of the failure of commutation at other loads due to the distortion of the field of the motor.

While, in the arrangement shown the alternating current motor 11 has been indicated as being of the type having two groups of phase windings and a field winding connected between the neutrals of the groups of phase windings it will, of course, be apparent to those skilled in the art that the principles of this invention may be applied to other motor connections such as the motor disclosed in the Alexanderson and Phillipi patents referred to above.

Reference may now be had to Fig. 2 in which there is shown an arrangement for transmitting energy from an alternating current circuit 10 to an alternating current motor 11 by means of a frequency converting system utilizing the valves 15 to 32, inclusive. Other elements disclosed in this figure which correspond to those elements shown in Fig. 1 have been given like reference characters. The particular feature which distinguishes the disclosure of Fig. 2 over that shown in Fig. 1 is the feature that the voltage supplied to the transformer winding 42 for the valve control circuit is modified in accordance with the current flowing from the source of alternating current 10 to the electric valve frequency converter. Thus there is connected between the phase shifting device 41 and the primary winding 42 of the control transformer, a current transformer arrangement comprising the windings 60, 61 and 62. One portion of each of the windings 60, 61 and 62 is connected in series between the phase shifting device 41 and the transformer 42 and operates as the secondary winding of a transformer of which the remaining portion of these inductors comprises the primary winding. The other terminal of the primary portions of these windings are connected through a delta arrangement of capacitors 63, 64 and 65. This combination of inductors 60, 61 and 62 and the capacitors 63, 64 and 65 operates to introduce in series with the potential obtained through the phase shifting device 41, a three-phase potential which is proportional to the current flowing in the conductors from the alternating current circuit 10. This additional three-phase component which is proportional to the current input to the converting system produces a resultant voltage across the primary winding 42 of the control transformer which advances the phase of the grid voltage by an angle which is nearly proportional to the load current. Thus when the load tends to increase the resultant grid voltage will be advanced in phase and the current transmitted by the valves of the system is increased. Thus in the present instance the distributor 55 operates to control the application of control voltage to the various groups of valves in accordance with an electrical condition of the motor phase windings due to the fact that the driving motor of the distributor is of the synchronous type and in addition thereto the valves of the various groups of valves are excited by control voltages which are advanced proportionally to increases in the load current. At no load condition of the motor 11 the brush holder of the distributor 55 is so adjusted that the motor speed is substantially equal to the desired full load speed. The compensating effect produced by the current responsive apparatus associated with the input circuit of the electric valve converting apparatus causes a phase advance in the effective grid voltage so that the valves of the apparatus are fully conductive at full load. If still a higher load current occurs the effective phase of the grid voltage will be still further advanced but the characteristics of the valves are such that such further advance in the control voltage has no effect upon the conductivity of the valves so that the automatic compensating potential introduced in the grid circuit does not render the system unstable. Thus at the lighter loads of the motor 11 the compensating effect introduced by the current responsive apparatus is such that the speed of the motor is limited to a predetermined value at no load and that the speed between no load and full load is substantially constant.

In Fig. 3, I have shown an electric valve frequency converting apparatus suitable for transferring energy between an alternating current supply circuit 70 and an alternating current load circuit 71. The converting apparatus includes a plurality of controlled electric valves arranged in groups of three 72, 73, 74; 75, 76, 77; 78, 79, 80; 81, 82, 83; 84, 85, 86; and 87, 88, 89. A plurality of inductors 90, 91 and 92 are each connected at an intermediate point thereon to one of the conductors of the output or load circuit 71. The left-hand terminal of the inductor 90 is connected to the group of valves 75 to 77 whereas the other terminal of the inductor 90 is connected to the group of valves 84 to 86. Similarly, one terminal of the inductor 91 is connected to the group of valves 72 to 74 and the other terminal thereof is connected to the group of valves 81 to 83. Likewise the one terminal of the inductor 92 is connected to the group of valves 78 to 80 and the other terminal thereof is connected to the group of valves 87 to 89. Between the inductors 90, 91, 92 and the various groups of valves of the converting apparatus there is connected a synchronous condenser 93 having one group of phase windings 94, 95, 96 and a second group of phase windings 97, 98, 99, each arranged in star relation and having connected between the neutral points thereof a rotatable field winding 100. The rotatable field winding 100 is energized by a series component of current sufficient to counteract the effect of the demagnetizing effect of the armature reactance of the machine and an auxiliary excitation voltage is supplied by the direct current generator 101 which is driven by the suitable motor 102 energized from the circuit 103. The source of potential derived from the generator 101 is applied across the field winding 100 to an inductor 104 and a resistor 105. The inductor 104 is included to insure that the proper smoothing effect is produced on the current flowing between the neutral points of the various phase winding groups. The resistor 105 operates to limit the series current flowing through the field 101 to the proper value. A suitable valve control circuit and distributor is connected to be operated from the shaft of the field winding 100. This valve control circuit and distributor 106 may be of a form similar to the control circuit used in conjunction with the electric valve frequency converter and motor shown in Fig. 1.

The general mode of operation of the electric valve frequency converter will be understood by those skilled in the art since it is similar to the operation of the electric valve frequency converter shown in connection with Figs. 1 and 2. Since the ordinary electric valve frequency converter has a power factor in the output circuit which tends to lower the voltage and reduce the counter-electromotive force thereby causing instability of operation, it is apparent that the synchronous condenser 93 having either series or compound excitation absorbs this demagnetizing component of the output current. The synchronous condenser has a load rating which is considerably less than the load rating of the electric valve frequency converter. Since there is no load on the shaft of the rotating field 100 a distributor may be mounted thereon and the control of the electric valves of the frequency converter will be such that the control is responsive to the voltage appearing across the various inductors 90 to 92 and which voltage is directly proportional to the voltage appearing across the conductor of the output circuit 71.

In Fig. 4, there is illustrated an electric valve frequency converter for transmitting energy from the alternating current supply circuit 110 to the load circuit 111. This frequency converter includes six groups of valves 112, 113, 114; 115, 116, 117; 118, 119, 120; 121, 122, 123; 124, 125, 126; and 127, 128, 129. The anodes of each of the valves 114, 117, 120 are connected through an inductor 130 to the left-hand conductor of the supply circuit 110, and each of the cathodes of the valves 123, 126, 129 are connected through an inductor 131 to the same conductor of the supply circuit. The anodes of each of the valves 113, 116, 119 are connected through an inductor 132 to the middle conductor of the polyphase supply circuit 110 and each of the cathodes of the valves 122, 125, 128 are connected through an inductor 133 to the same supply conductor. Each of the anodes of the valves 112, 115, 118 are connected through an inductor 134 to the right conductor of the supply circuit 110 and each of the cathodes of the valves 121, 124, 127 are connected through an inductor 135 to the same conductor. The cathodes of the valves 112, 113, 114 and the anodes of the valves 121, 122, 123 are all connected to the right conductor of the output circuit 111. The cathodes of the valves 115, 116, 117 and the anodes of the valves 124, 125, 126 are all connected to the intermediate conductor of the output circuit 111. The cathodes of the valves 118, 119, 120 and the anodes of the valves 127, 128, 129 are each connected to the left conductor of the output circuit 111.

The control circuit for this electric valve frequency converter includes a suitable phase shifting device 136 energized from the input circuit 110. The phase shifting device 136 is connected through a portion of each of the inductors 137, 138 and 139 which operate as current transformers responsive to the current flowing through the conductors of the input circuit 110. The remaining portions of the inductors 137, 138 and 139 operate as the primary windings of the transformers and these are connected through a delta bank of capacitors 140, 141 and 142. The voltage obtained from the phase shifting device 136 and the inductive windings 137, 138 and 139 is transmitted to the primary winding 143 of a control transformer. The secondary winding 144 of this transformer is arranged in star relation with the neutral point thereof connected to the rotating element of the distributor 145. Each of the brushes of the distributor 145 controls one of the six groups of valves of the frequency converter. For the purposes of simplicity in disclosure and explanation only the grid circuit or control circuit of the valve 129 has been shown. This control circuit includes the current limiting resistor 146 and one winding of the transformer 147. The primary winding of the transformer 147 is connected in series with one of the phase windings of the transformer secondary winding 144 and with a unilaterally conductive device 148 which is connected to one of the brushes of the distributor 145. The distributor 145 is arranged to be operated from a synchronous motor 149 which is energized from a transformer 150, the primary winding of which is connected to the output circuit 111.

The operation of the arrangement disclosed in Fig. 4 is believed to be apparent to those skilled in the art since the arrangement of the valves in the electric valve frequency converter is similar to that disclosed in U. S. Letters Patent No. 1,930,302 granted October 10, 1933, upon the application of B. D. Bedford, Serial No. 586,106, filed January 12, 1932. In accordance with the present arrangement the valves are controlled in accordance with the frequencies of the input and output circuits, the input frequency being supplied to the phase-shifting device 136 and the output frequency being obtained by means of the distributor 145 which is operated by the synchronous motor 149 which is energized from the output circuit. The inductors 137, 138 and 139 which operate as current transformers responsive to the current flow from the supply circuit to the electric valve converter introduce a voltage component into the transformer 143 which is proportional to the load current and which produces a resultant phase excitation of the valves so that the moment of ignition of the valve is retarded in phase by an angle which is approximately proportional to the load current. Thus in the present instant an increase in the load current would cause a regulating action to be performed which would tend to maintain the output of the electric valve converter constant over the predetermined range and thus it will be apparent that the valves are controlled in accordance with an electrical condition of the input circuit and an electrical condition of the output circuit since the distributor is operated by a synchronous motor 149 which is responsive to the voltage conditions appearing across the output circuit 111.

While in the arrangement disclosed in Figs. 1, 2 and 4 the control of the valves has been made subject to an electrical condition of the output of the electric valve frequency converter by means of the distributor operated from a synchronous motor, it will be apparent that any other form of control may be utilized which is responsive to the same electrical condition of the output circuit. As will be apparent to those skilled in the art, such an arrangement may be utilized without departing from my invention in its broader aspects by the use of saturable transformers operated in accordance with the teachings set forth in U. S. Letters Patent No. 1,985,912, granted January 1, 1935, upon the application of Burnice D. Bedford, and which is assigned to the same assignee as the present application.

While I have shown and described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a source of alternating current, a dynamo-electric machine having a plurality of phase windings and a field winding, means for supplying an excitation component to said field winding, means for supplying to the said field winding an additional excitation component, a plurality of controlled electric valves for transmitting periodic current from said source to the phase windings of said machine, a control circuit for said valves including means for deriving a potential component from said source and a distributor serially connected with said means, and means for controlling said distributor in accordance with an electrical condition of one of said windings and independently of the variation with load of the mechanical displacement of said field winding and the terminal voltage of said phase windings.

2. In combination, a source of alternating current, a dynamo-electric machine having a plurality of phase windings and a serially connected field winding, means for supplying to said field winding an additional excitation component, a plurality of controlled electric valves for transmitting periodic current from said source to the phase windings of said machine, a control circuit for said valves including means for deriving a potential component from said source and a distributor serially connected with said means, and means for controlling said distributor so that the position of said distributor relative to the phase of the terminal voltage of said phase windings is independent of the load on said dynamo-electric machine.

3. In combination, a source of alternating current, a dynamo-electric machine having a plurality of phase windings and a field winding, means for supplying a separate excitation component to said field winding, a plurality of electric valves for controlling the energy transmitted from said source to the phase windings of said machine, and means for controlling said valves including means for deriving a potential component from said source tending to vary the conductivities of said valves in accordance with the energy transmitted to said dynamo-electric machine and means operable in fixed phase relation with the voltage of said phase windings for controlling the application of said potential component.

4. In combination, a source of alternating current, a dynamo-electric machine having a plurality of phase windings, a plurality of controlled electric valves for transmitting energy from said source to said machine, a control circuit for said valves including means for deriving a potential component from said source, a distributor serially connected with said means, and a motor operatively connected to said phase windings for driving said distributor.

5. In combination, a source of alternating current, a dynamo-electric machine having a plurality of phase windings, a plurality of controlled valves for transmitting energy from said source to said machine, a control circuit for said valves including means responsive to the energy transmitted to said machine for deriving a potential component from said source having a phase relation thereto which is automatically controlled in dependence upon the amount of energy transmitted to said machine, a distributor connected serially with said means, and means for controlling said distributor in accordance with an operating condition of said machine.

6. In combination, a source of alternating current, a dynamo-electric machine having a plurality of phase windings, a plurality of controlled valves for transmitting energy from said source to said machine, a control circuit for said valves including means for deriving a potential component from said source having a phase relation thereto dependent upon the amount of energy transmitted to said machine, a distributor connected serially with said means, and a motor connected to said phase windings for driving said distributor.

7. In combination, a source of alternating current, a dynamo-electric machine having a plurality of phase windings and a field winding, means for supplying an excitation component to said field winding, means for supplying to said field winding an additional excitation component, a plurality of controlled electric valves for transmitting current from said source to said machine, means for periodically rendering said valves alternately conductive and nonconductive, and means for varying the frequency of said conductivity controlling means as a function of the speed of said machine, said last two mentioned means including means for deriving a potential component from said source, a pair of distributors arranged to be serially connected with said last mentioned means, and a switch for alternately connecting one or the other of said distributors in series with said last mentioned means.

8. In combination, a source of alternating current, a dynamo-electric machine having a plurality of phase windings and a field winding, a plurality of controlled electric valves for transmitting current from said source to said machine, a control circuit for said valves including means for deriving a potential component from said source and a pair of distributors arranged to be serially connected with said last mentioned means, one of said distributors being drivingly connected with said dynamo-electric machine, a separate synchronous motor energized from said phase windings for driving said other distributor, and a switch for alternately connecting one or the other of said distributors in series with said last mentioned means.

9. The combination of a source of current, a dynamo-electric machine having a plurality of phase windings and a field winding, a plurality of electric valves for transmitting energy between said source and said machine, means for periodically rendering said valves alternately conductive and nonconductive, means for varying the frequency of said conductivity controlling means as a function of the speed of said machine, means for energizing said field winding with a variable component of excitation to compensate for the demagnetizing effect of the current in said phase windings, and additional means for simultaneously supplying a relatively constant amount of excitation to said field winding.

10. The combination of a source of current, a dynamo-electric machine having a plurality of phase windings and a field winding connected in series relation therewith, a plurality of electric valves interconnecting said source and said machine for supplying current thereto, means for periodically rendering said valves alternately conductive and nonconductive, and means for varying the frequency of said conductivity controlling means as a function of the speed of said machine, means connected in parallel with said field winding for simultaneously supplying a component of excitation to said field winding independently of the current traversing said phase windings, said last mentioned means including an impedance for controlling the portion of current flowing in said phase windings which passes through said field winding so that the series excitation is sufficient to overcome the demagnetizing action of the current flowing in said phase windings.

11. In combination, a source of alternating current, a synchronous type dynamo-electric machine having a plurality of phase windings and a field winding, a plurality of controlled electric valves interconnecting said source and the phase windings of said machine, means for supplying excitation to said field winding, and a control circuit for said valves including means responsive to the energy transmitted to said phase windings for deriving a control potential which is varied automatically to render said valves conductive at an earlier time in the voltage wave of said alternating current source as the energy transmitted to the phase windings of said machine is increased to maintain the speed of said machine constant with varying load.

ERNST F. W. ALEXANDERSON.